United States Patent
Park et al.

(10) Patent No.: US 10,025,374 B2
(45) Date of Patent: Jul. 17, 2018

(54) INPUT/OUTPUT INTERFACE CONTROL METHOD AND ELECTRONIC APPARATUS PERFORMING SAME

(71) Applicant: Samsung Electronics Co., Ltd, Gyeonggi-do (KR)

(72) Inventors: Chahoon Park, Seoul (KR); Sangju Kim, Gyeonggi-do (KR); Kangseok Cho, Gyeonggi-do (KR); Jaedeok Cha, Gyeonggi-do (KR); Kikwon Bin, Gyeonggi-do (KR); Sungyun Jin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/269,978

(22) Filed: Sep. 19, 2016

(65) Prior Publication Data

US 2017/0010659 A1    Jan. 12, 2017

Related U.S. Application Data (63) Continuation of application No. PCT/KR2015/002146, filed on Mar. 5, 2015.

(30) Foreign Application Priority Data

Mar. 18, 2014    (KR) .................. 10-2014-0031563

(51) Int. Cl.
*G06F 13/38*    (2006.01)
*G06F 1/32*    (2006.01)
(Continued)

(52) U.S. Cl.
CPC .............. *G06F 1/3287* (2013.01); *G06F 1/26* (2013.01); *G06F 1/266* (2013.01); *G06F 13/14* (2013.01);
(Continued)

(58) Field of Classification Search
CPC .......... G06F 1/32; G06F 13/38; H02J 7/0004; H02J 2007/0062
See application file for complete search history.

(56) References Cited

U.S. PATENT DOCUMENTS 6,362,610 B1 *    3/2002    Yang ...................... G06F 1/266
                                                              323/281
7,694,032 B2 *    4/2010    Lim ..................... G06F 13/4081
                                                              710/14
(Continued)

FOREIGN PATENT DOCUMENTS

JP    H08-308138    11/1996
KR    10-2008-0070202    7/2008
(Continued)

OTHER PUBLICATIONS

International Search Report dated May 26, 2015 in connection with International Patent Application No. PCT/KR2015/002146, 4 pages.
(Continued)

*Primary Examiner* — Henry Tsai
*Assistant Examiner* — Christopher A Daley (57) ABSTRACT

An electronic apparatus according to an embodiment of the present disclosure may include an input/output interface, the mode of which can be changed to a data communication mode or a charging mode. An electronic apparatus according to an embodiment of the present disclosure may include: a connector to which an external electronic apparatus having an interface that can be connected to an input/output interface is connected; a power supply unit for supplying power to the external electronic apparatus through a power supply line connected to the connector; a host controller for controlling data transmission from and to the external electronic apparatus; and a mode controlling unit for measuring electric current flowing through the power supply line, changing an operation mode on the basis of a result obtained by (Continued)

comparing the electric current value with a reference value, and controlling operations of the power supply unit and the host controller according to the operation mode.

19 Claims, 6 Drawing Sheets

(51) Int. Cl.
*G06F 13/14* (2006.01)
*G06F 1/26* (2006.01)
*H02J 7/00* (2006.01)

(52) U.S. Cl.
CPC .......... *G06F 13/385* (2013.01); *H02J 7/0004* (2013.01); *H02J 2007/0062* (2013.01)

(56) References Cited

U.S. PATENT DOCUMENTS

| | | | | |
|---|---|---|---|---|
| 7,791,854 | B2* | 9/2010 | Chu | G06F 1/266 361/93.9 |
| 8,892,912 | B2* | 11/2014 | Lai | G06F 1/266 713/300 |
| 9,483,077 | B2* | 11/2016 | Thompson | G06F 1/263 |
| 2008/0183909 | A1 | 7/2008 | Lim et al. | |
| 2010/0090644 | A1 | 4/2010 | Nokkonen et al. | |
| 2010/0097030 | A1* | 4/2010 | Kim | G06F 1/1601 320/106 |
| 2010/0115147 | A1 | 5/2010 | Kim | |
| 2011/0016334 | A1* | 1/2011 | Tom | G06F 1/266 713/300 |
| 2011/0037428 | A1* | 2/2011 | Sakaguchi | G06F 1/1632 320/107 |
| 2012/0331312 | A1 | 12/2012 | Lu | |
| 2013/0015808 | A1* | 1/2013 | Lee | G06F 1/263 320/103 |
| 2013/0166928 | A1 | 6/2013 | Yang | |
| 2013/0191566 | A1* | 7/2013 | Kaestner | G06F 13/4072 710/104 |
| 2013/0265000 | A1* | 10/2013 | Beaury | H02J 7/0042 320/107 |
| 2014/0084850 | A1* | 3/2014 | Lee | G06F 1/266 320/107 |
| 2015/0137618 | A1* | 5/2015 | Vaajala | H02H 3/0935 307/116 |

FOREIGN PATENT DOCUMENTS

| | | |
|---|---|---|
| KR | 10-2010-0005055 | 1/2010 |
| KR | 10-2010-0047967 | 5/2010 |
| KR | 10-2013-0074055 | 7/2013 |

OTHER PUBLICATIONS

Written Opinion of the International Searching Authority dated May 26, 2015 in connection with International Patent Application No. PCT/KR2015/002146, 6 pages.

* cited by examiner

INPUT/OUTPUT INTERFACE CONTROL METHOD AND ELECTRONIC APPARATUS PERFORMING SAME

CROSS-REFERENCE TO RELATED APPLICATION(S) AND CLAIM OF PRIORITY

This application is a continuation of International Application No. PCT/KR2015/002146 filed on Mar. 5, 2015, which claims priority to Korean Patent Application No. 10-2014-0031563 filed on Mar. 18, 2014, each of which are hereby incorporated by reference into the present disclosure as if fully set forth herein.

TECHNICAL FIELD

Various embodiments of the present disclosure relate to an input/output interface control method for detecting a connection state of an external electronic device connected to the electronic device through an input/output (I/O) interface and for changing an operating mode of the I/O interface, and to an electronic device performing the method.

BACKGROUND

Recently most electronic devices have an I/O interface for a universal serial bus (USB). When a certain electronic device is connected to an external electronic device through the I/O interface, the electronic device can transmit or exchange data to or with the external electronic device. The I/O interface may perform a charging function of the external electronic device connected to the electronic device as well as a data communication function. In this case, operating modes for performing these respective functions may be established in the I/O interface. For example, depending on functions being performed, the I/O interface may have a mode of targeting a data communication with the external electronic device and a dedicated charging mode only for charging of the external electronic device. In this case, the electronic device including the I/O interface may change the operating mode of the I/O interface to the data communication mode or the charging mode, depending on a user's manual input. However, since a user cannot exactly know the established operating mode of the I/O interface, a new external electronic device connected to the electronic device which is in the charging mode may often cause a failure in recognition. Also, in case of changing or establishing the operating mode of the I/O interface to the charging mode even though the external electronic device does not support the charging mode, the external electronic device connected to the electronic device may often cause a failure in recognition and a failure in operation.

SUMMARY

To be provided is an input/output interface control method, together with an electronic device performing the method, for changing an operating mode of an input/output interface depending on a connection state of an external electronic device and a state of an electric current supplied in a charging mode.

An electronic device according to various embodiments of this disclosure may include a connector to which an external electronic device having an interface connectable to an input/output interface is connected; a power supply unit for supplying electric power to the external electronic device through a power supply line connected to the connector; a host controller for controlling data transmission to or from the external electronic device; and a mode control unit for measuring an electric current flowing through the power supply line, changing the operating mode based on a result of comparing a measured current value with a reference value, and controlling operations of the power supply unit and of the host controller depending on the operating mode.

An input/output (I/O) interface control method according to various embodiments of this disclosure may include operations of identifying a connection state of an external electronic device connected to a connector; and when a connection of the external electronic device is released, changing the operating mode of the I/O interface to the data communication mode. Also, the I/O interface control method according to various embodiments of this disclosure may further include operations of identifying the operating mode of the I/O interface; when the operating mode of the I/O interface is the charging mode, measuring an electric current of a power supply line for supplying electric power to the external electronic device; comparing a measured current value with a reference value; and if the current value is smaller than the reference value, changing the operating mode of the I/O interface to the data communication mode.

An input/output (I/O) interface control method according to various embodiments of this disclosure may include operations of receiving, from a user, a mode change command to change the operating mode of the I/O interface to the charging mode; determining whether the external electronic device connected to the connector supports the charging mode; and if the external electronic device fails to support the charging mode, changing the operating mode of the I/O interface to the data communication mode.

The I/O interface control method and device according to various embodiments of this disclosure may prevent failures in recognition and operation of the external electronic device by changing the operating mode of the I/O interface to the data communication mode when the external electronic device connected to the electronic device through the I/O interface is released from connection.

The I/O interface control method and device according to various embodiments of this disclosure may prevent an unnecessary charging operation by changing the operating mode of the I/O interface to the data communication mode when charging of the connected external electronic device is completed.

The I/O interface control method and device according to various embodiments of this disclosure may prevent failures in recognition and operation of the connected external electronic device by changing the operating mode of the I/O interface to the data communication mode when the connected external electronic device fails to support the charging function.

The I/O interface control method and device according to various embodiments of this disclosure may prevent failures in recognition and operation of the connected external electronic device by changing the operating mode of the I/O interface depending on situations.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

As used herein, the singular forms "a", "an", and "the" are intended to include the plural forms, including "at least one", unless the content clearly indicates otherwise. "Or" means "and/or". As used herein, the term "and/or" includes any and all combinations of one or more of the associated listed items. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element", "component", "region", "layer" or "section" discussed below could be termed a second element, component, region, layer or section without departing from the teachings herein.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this disclosure.

Figure 1:
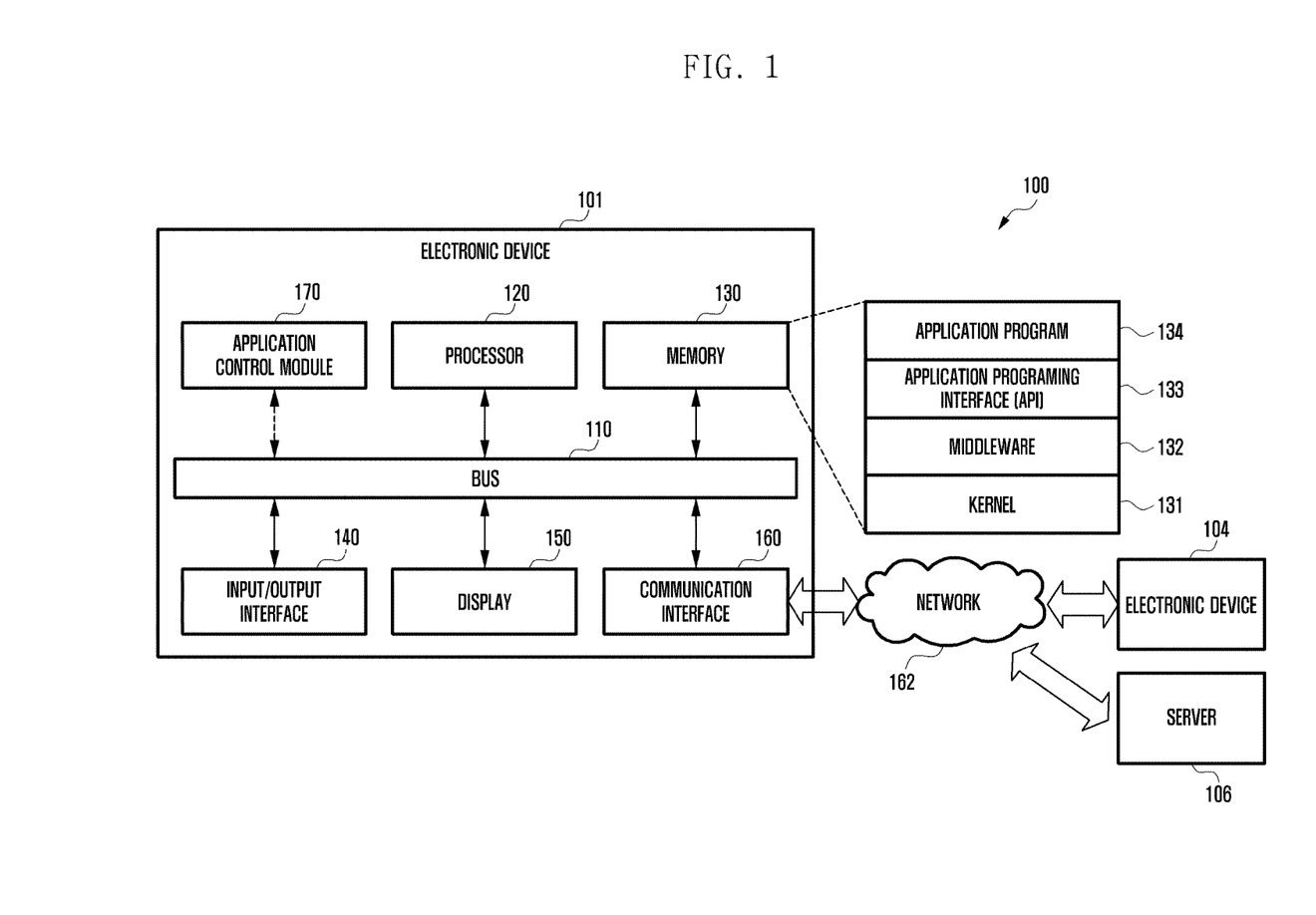
FIG. 1 is a diagram illustrating a network environment including an electronic device according to various embodiments of the present disclosure.

FIG. 1 is a block diagram illustrating a network environment 100 including therein an electronic device 101 in accordance with an embodiment of the present disclosure. Referring to FIG. 1, the electronic device 101 may include, but not limited to, a bus 110, a processor 120, a memory 130, an input/output interface 140, a display 150, a communication interface 160, and an application control module 170.

The bus 110 may be a circuit designed for connecting the above-discussed elements and communicating data (e.g., a control message) between such elements.

The processor 120 may receive commands from the other elements (e.g., the memory 130, the input/output interface 140, the display 150, the communication interface 160, or the application control module 170, etc.) through the bus 110, interpret the received commands, and perform the arithmetic or data processing based on the interpreted commands.

The memory 130 may store therein commands or data received from or created at the processor 120 or other elements (e.g., the input/output interface 140, the display 150, the communication interface 160, or the application control module 170, etc.). The memory 130 may include programming modules such as a kernel 131, a middleware 132, an application programming interface (API) 133, and an application 134. Each of the programming modules may be composed of software, firmware, hardware, and any combination thereof.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may offer an interface that allows the middleware 132, the API 133 or the application 134 to access, control or manage individual elements of the electronic device 101.

The middleware 132 may perform intermediation by which the API 133 or the application 134 communicates with the kernel 131 to transmit or receive data. Additionally, in connection with task requests received from the applications 134, the middleware 132 may perform a control (e.g., scheduling or load balancing) for the task request by using technique such as assigning the priority for using a system resource of the electronic device 101 (e.g., the bus 110, the processor 120, or the memory 130, etc.) to at least one of the applications 134.

The API 133 which is an interface for allowing the application 134 to control a function provided by the kernel 131 or the middleware 132 may include, for example, at least one interface or function (e.g., a command) for a file control, a window control, an image processing, a text control, and the like.

According to embodiments, the application 134 may include an SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 134 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device (e.g., the electronic device 104). Additionally or alternatively, the notification relay application may receive notification information from an external electronic device (e.g., the electronic device 104) and offer it to a user. The device management application may manage (e.g., install, remove or update) a certain function (a turn-on/turn-off of an external electronic device (or some components thereof), or an adjustment of brightness (or resolution) of a display) of any external electronic device (e.g., the electronic device 104) communicating with the electronic device 101, a certain application operating at such an external electronic device, or a certain service (e.g., a call service or a message service) offered by such an external electronic device.

According to embodiments, the application 134 may include a specific application specified depending on attributes (e.g., a type) of an external electronic device (e.g., the electronic device 104). For example, in case an external electronic device is an MP3 player, the application 134 may include a specific application associated with a play of music. Similarly, in case an external electronic device is a portable medical device, the application 134 may include a specific application associated with a health care. In an embodiment, the application 134 may include at least one of an application assigned to the electronic device 101 or an application received from an external electronic device (e.g., the server 106 or the electronic device 104).

The input/output interface 140 may deliver commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 may display thereon various kinds of information (e.g., multimedia data, text data, etc.) to a user.

The communication interface 160 may perform a communication between the electronic device 101 and any external electronic device (e.g., the electronic device 104 of the server 106). For example, the communication interface 160 may communicate with any external device by being connected with a network 162 through a wired or wireless communication. A wireless communication may include, but not limited to, at least one of WiFi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.). A wired communication may include, but not limited to, at least one of USB (Universal Serial Bus), HDMI (High Definition Multimedia Interface), RS-232 (Recommended Standard 232), or POTS (Plain Old Telephone Service).

According to an embodiment, the network 162 may be a communication network, which may include at least one of a computer network, an internet, an internet of things, or a telephone network. According to an embodiment, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160.

The application control module 170 may process at least part of information obtained from the other elements (e.g., the processor 120, the memory 130, the input/output interface 140, or the communication interface 160, etc.) and then offer it to a user in various ways. For example, the application control module 170 may recognize information about access components equipped in the electronic device 101, store such information in the memory 130, and execute the application 134 on the basis of such information. A further description about the application control module 170 will be given hereinafter through FIGS. 2 to 9.

Figure 2:
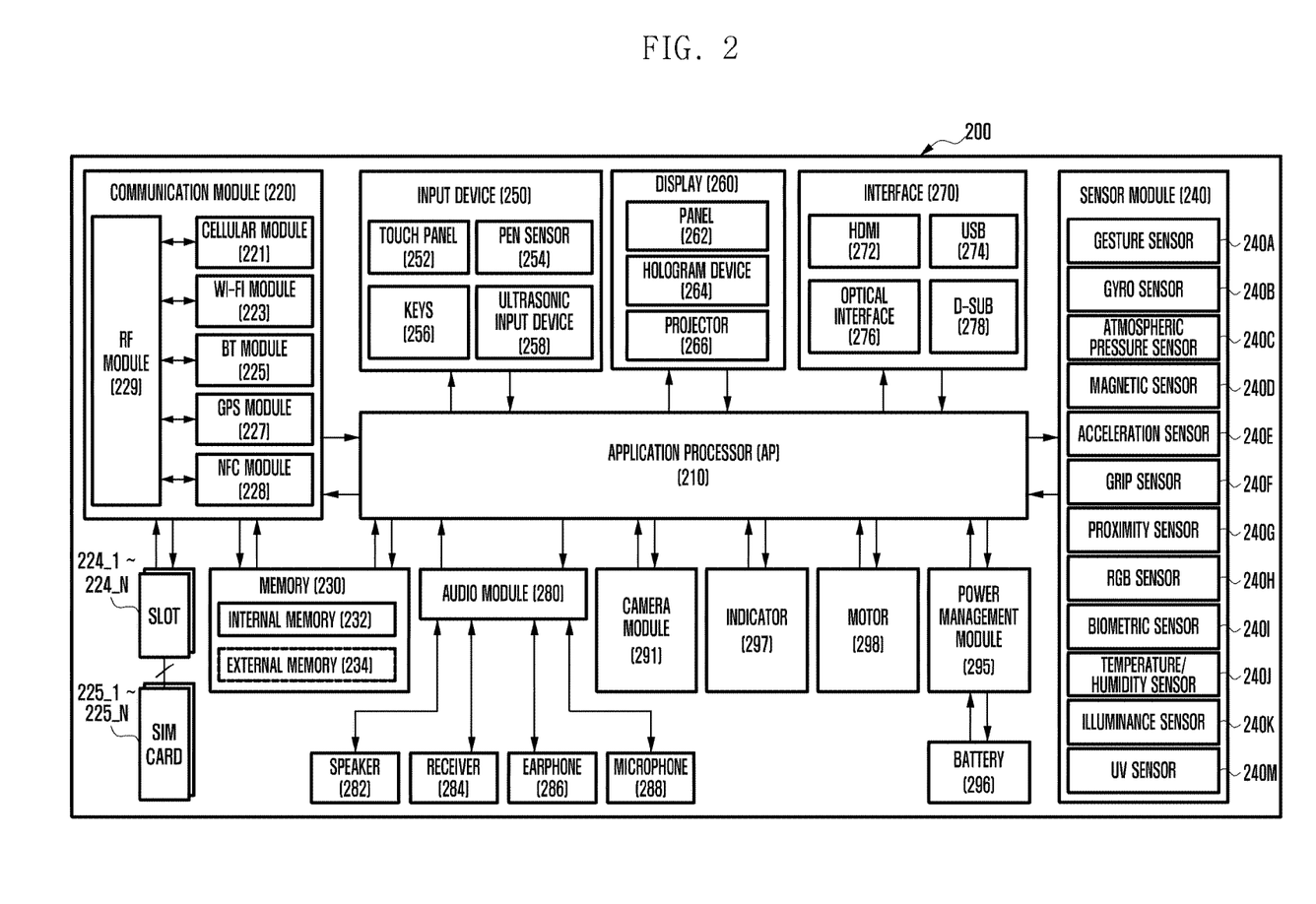
FIG. 2 is a diagram illustrating the configuration of an electronic device according to various embodiments of the present disclosure.

FIG. 2 is a block diagram illustrating an electronic device 201 in accordance with an embodiment of the present disclosure. The electronic device 201 may form, for example, the whole or part of the electronic device 101 shown in FIG. 1. Referring to FIG. 2, the electronic device 201 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 160) may perform a data communication with any other electronic device (e.g., the electronic device 104 or the server 106) connected to the electronic device 200 (e.g., the electronic device 101) through the network. According to an embodiment, the communication module 220 may include therein a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224_1 to 224_N may be a specific card formed of SIM and may be inserted into a slot 225_1 to 225_N formed at a certain place of the electronic device. The SIM card 224_1 to 224_N may contain therein an ICCID (Integrated Circuit Card IDentifier) or an IMSI (International Mobile Subscriber Identity).

The memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 200 through various interfaces. According to an embodiment, the electronic device 200 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 150) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 160 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained, for example, in the input/output interface 140 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 200. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The motor 298 may convert an electric signal into a mechanical vibration. Although not shown, the electronic device 200 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

Figure 3:
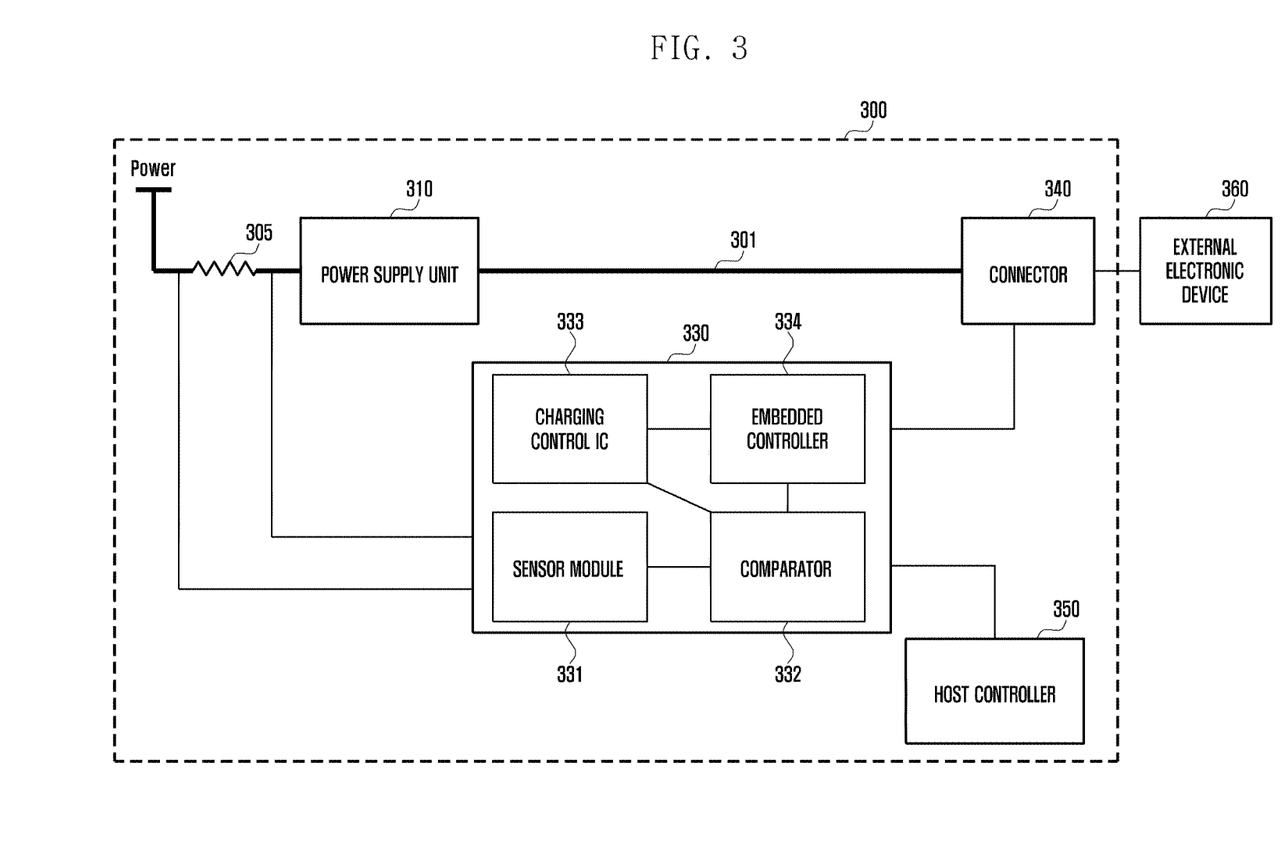
FIG. 3 is a diagram illustrating the configuration and operation of an electronic device according to various embodiments of the present disclosure.

FIG. 3 is a diagram illustrating the configuration and operation of an electronic device 300 according to various embodiments of the present disclosure.

The electronic device 300 may include a power supply unit 310, a mode control unit 330, a connector 340, and a host controller 350. FIG. 3 shows, however, some elements only for illustration of the operation of the electronic device 300 according to one embodiment of this disclosure, and the electronic device 300 may further include other elements of the electronic devices 100 and 200 shown in FIGS. 1 and 2.

According to an embodiment of the present disclosure, an I/O interface contained in the electronic device 300 may be changed in mode to a data communication mode or to a charging mode. This I/O interface may include the I/O interface 270 shown in FIG. 2. The I/O interface 270 of the electronic device 300 may include elements shown in FIG. 3.

Hereinafter, a USB device having a USB connection interface will be described as an example of an external electronic device 360 in FIG. 3. In this case, the I/O interface 270 may be the USB interface 274. However, in addition to the USB device 360, any other type electronic device which can be connected to the connector 340 of the electronic device 300 and transmit data to the electronic device 300 may be used as the external electronic device. Further, the I/O interface 270 to be used is not limited to the USB interface 274.

In various embodiments of the present disclosure, the charging mode may be a dedicated charging port (DCP) mode, and the data communication mode may be one of a standard downstreaming port (SDP) mode and a charging downstreaming port (CDP) mode. In the DCP mode, the I/O interface 270 (e.g., the USB interface 274) fails to perform a data communication function and provides a charging function of up to 1.5 A. In the SDP mode, the I/O interface 270 (e.g., the USB interface 274) performs the data communication function and provides the charging function of up to 500 mA. In the CDP mode, the I/O interface 270 (e.g., the USB interface 274) performs the data communication function and provides the charging function of up to 1.5 A.

Hereinafter, the electronic device 300 according to an embodiment of the present disclosure will be described with reference to FIG. 3.

The power supply unit 310 may supply electric power to the external electronic device 360 (e.g., a USB device) through a power supply line 301 connected to the connector 340. The power supply line 301 may connect the power supply unit 310 and the connector 340. The power supply line 301 may be a BUS used as a transmission path through which data and electric power are transmitted. The power supply line 301 may be a VBUS which supplies only electric power rather than data communication. Specifically, the power supply unit 310 may supply electric power to the connector 340 through the power supply line 301 and to the external electric device 360 through a cable connected to the connector 340. If the external device 360 is connected directly to the connector 340 without any cable, the power supply unit 310 may supply electric power to the external electronic device 360 through the power supply line 301 and the connector 340. Such electric power may be an electric current flowing through the power supply line 301. The power supply unit 310 may include the power management module 295 and the battery 296. The power supply unit 310 may deliver, to the power supply line 301, electric power stored in the power management module 295 and the battery 296. Additionally, the power supply unit 310 may deliver, to the power supply line 301, electric power received from the outside by the electronic device 300 (e.g., in case the electronic device 300 receives electric power through a power cable or the like).

According to an embodiment of the present disclosure, the power supply unit 310 may include a limit circuit. The limit circuit may prevent an electric current greater than a setting value from flowing to the power supply line 301. The power supply line 301 may have an allowable current value so as to prevent a failure or an accident. In this case, the setting value may be established as a value equal to or smaller than the allowable current value. The limit circuit prevents an electric current, greater than the setting value, from flowing through the power supply line 301, thereby preventing a safety accident and a failure of the electronic device 300. The setting value may be determined and changed arbitrarily by a user. The user may input the setting value through the input module 250. The mode control unit 330 may measure an electric current flowing through the power supply line 301. The mode control unit 330 may have an ammeter or current measuring sensor for measuring the current. Any point on the power supply line 301 may be used for the mode control unit 330 to measure the current.

The electronic device 300 may further include a sensing resistor 305 which is inserted in the power supply line 301 as current measurement target of the mode control unit 330. The sensing register 305 may be a resistor inserted in a point on which the mode control unit 330 measures the current.

The mode control unit 330 may compare the measured current value with a predetermined reference value. The reference value may be determined and changed arbitrarily by a user. The user may input the reference value through the input module 250. The mode control unit 330 may change differently the mode of the I/O interface 270 by distinguishing between a case where the measured current value is equal to or greater than the reference value and another case where the measured current value is smaller than the reference value.

Referring to FIG. 3, in an embodiment of the present disclosure, the mode control unit 330 may include a sensor module 331 and a comparator 332.

The sensor module 331 may measure an electric current flowing through the power supply line 301. The sensor module 331 may include a sensor for measuring the current. Any well-known sensor capable of measuring the current may be used. The sensor module 331 may transmit the measured current value to the comparator 332. The sensor module 331 may be or include the sensor module 240 shown in FIG. 2. Namely, the sensor module 331 may measure a physical quantity or detect an operating state of the electronic device 330, and then convert the measured or detected information to an electric signal. The sensor module 331 may include, for example, at least one of the gesture sensor 240A, the gyro sensor 240B, the atmospheric pressure sensor 240C, the magnetic sensor 240D, the acceleration sensor 240E, the grip sensor 240F, the proximity sensor 240G, the color sensor 240H (e.g., the red, green, and blue (RGB) sensor), the biometric sensor 240I, the temperature/humidity sensor 240J, the illumination sensor 240K, and the ultra violet (UV) sensor 240M. Additionally or alternatively, the sensor module 331 may include, for example, an E-nose sensor (not shown), an electromyography (EMG) sensor (not shown), an electroencephalogram (EEG) sensor (not shown), an electrocardiogram (ECG) sensor (not shown), an infra red (IR) sensor (not shown), an iris sensor (not shown), a fingerprint sensor (not shown), and the like. The sensor module 331 may further include a control circuit for controlling one or more sensors included therein.

The comparator 332 may compare the measured current value with the reference value. In this case, depending on results of comparison, the comparator 332 may output a comparison signal. The reference value, which indicates a reference current value, may be predetermined or changed arbitrarily by a user. Any signal which can distinguish whether the current value is greater or smaller than the reference value may be used as the comparison signal. For example, the comparator 332 may output the comparison signal indicating 1 (or high) when the current value is greater than the reference value, and the comparison signal indicating 0 (or low) when the current value is smaller than the reference value. On the contrary, using an inverter, the comparator 332 may output the comparison signal indicating 0 (or low) when the current value is greater than the reference value, and the comparison signal indicating 1 (or high) when the current value is smaller than the reference value. Namely, any type of signal which can denote sizes of the current value and reference value may be used as the comparison signal according to user's intention.

Specifically, if charging of the external electric device 360 (e.g., USB) is completed when the operating mode of the I/O interface 270 is the charging mode, the current flowing through the power supply line 301 may decrease. For example, while charging of the USB device 360 is in progress, an electric current of about 1.4 A may flow through the power supply line 301. Then, if charging of the USB device 360 is completed, the current flowing through the power supply line 301 decreases gradually and reaches 300 mA or less. In this case, if the reference value is established as 400 mA, the comparator 332 may output, during the charging of the USB device 360, a comparison signal indicating that the measured current value is greater than the reference value, and output, after the charging of the USB device 360, a comparison signal indicating that the measured current value is smaller than the reference value.

Similarly, if the connection of the external electric device 360 (e.g., the USB device) is released, there is no target for supply of the current and thereby the current flowing through the power supply line 301 decreases near to 0 A. Additionally, if the connection of the USB device 360 is released, no or less power may flow through the power supply line 301. Therefore, in case the connection of the USB device 360 is released, the comparator 332 of the electric device 300 according to an embodiment of this disclosure may output the comparison signal indicating that the measured current value is smaller than the reference value.

The mode control unit 330 may change the operating mode of the I/O interface 270, based on the comparison signal. In response to the comparison signal outputted by the comparator 332, the mode control unit 330 may change the mode of the I/O interface 270 to one of the data communication mode and the charging mode. In the data communication mode, both the transmission of data and the supply of power may be performed simultaneously for the external electric device 360. Alternatively, in the data communication mode, only the data transmission between the electric device 300 and the external electric device 360 may be performed. However, in the charging mode, only a charging operation (the supply of power) may be performed without data transmission.

The mode control unit 330 may analyze the comparison signal outputted by the comparator 332 and then determine whether the current value measured by the sensor module 331 is greater or smaller than the reference value. If the current value is greater than the reference value, the mode control unit 330 may change the operating mode from the data communication mode to the charging mode. On the contrary, if the current value is smaller than the reference value, the mode control unit 330 may change the operating mode to the data communication mode.

If the current value is equal to or greater than the reference value when the I/O interface 270 is in the charging mode, or if the current value is smaller than the reference value when the I/O interface 270 is in the data communication mode, the mode control unit 330 may maintain the operating mode of the I/I interface 270 without change.

The mode control unit 330 may control the power supply unit 310 to supply electric power to the external electric device 360 (e.g., the USB device) when the operating mode of the I/O interface 270 is the charging mode, and also may stop the supply of power of the power supply unit 310 when the operating mode of the I/O interface 270 is the data communication mode. In addition, depending on whether the operating mode is the charging mode or the data communication mode, the mode control unit 330 may control differently the amount of power supply of the power supply unit 310. For example, the mode control unit 330 may control the power supply unit 310 to supply electric power of 1.5 A in the charging mode and control the power supply unit 310 to supply electric power of 0.5 A in the data communication mode. The amount of electric power supplied by the power supply unit 310 in each operating mode may be changed according to a user's intention.

In the electronic device 300 according to an embodiment of the present disclosure, the mode control unit 330 may include a charging control IC 333 and an embedded controller 334.

The charging control IC 333 may control the operation of the power supply unit 310. Whenever the operating mode of I/O interface 270 is changed, the charging control IC 333 may control the power supply unit 310 to perform or stop the supply of electric power. Additionally, in order to prevent an error from occurring at the moment the mode of the I/O interface 270 is changed, the charging control IC 333 may stop the operation of the power supply unit 310 whenever the operating mode of the I/O interface 270 is changed (for example, in case of changing the mode of the I/O interface 270 from the charging mode to the data communication mode, the charging control IC may stop the operation of the power supply unit 310 before a change in mode and then change the operating mode of the I/O interface 270).

The embedded controller 334 may change the operating mode of the I/O interface 270 in response to a user's input. The embedded controller 334 may have a microcomputer (MICOM) or I/O hub chip. The embedded controller 334 may have a switch for receiving a user's command to change the mode. The switch may be a physical switch (or a button) equipped externally on the electronic device 300. In this case, if a user inputs a mode change command by manipulating the switch, the embedded controller 334 may deliver the command to the charging controller IC 333. Therefore, the electronic device 300 according to an embodiment of the present disclosure may change the operating mode of the I/O interface 270 by a user's manual input.

According to another embodiment, the embedded controller 334 may include an input unit (not shown) for receiving a user's input. The input unit may include the input module shown in FIG. 2. Based on information received from a user through the input unit, the embedded controller 334 may change the mode of the I/O interface 270 in the software manner.

According to an embodiment of the present disclosure, when the connection of the external electronic device 360 (e.g., the USB device) connected to the connector 340 is released, the mode control unit 330 may change the mode of the I/O interface 270 to the data communication mode. The mode control unit 330 may check whether the external electronic device 360 (e.g., the USB device) is connected to the connector 340. Specifically, when the connection of the external electronic device 360 (e.g., the USB device) is released from the connector 340, the current value of the power supply line 301 measured by the mode control unit 330 decreases. For example, a connection release of the USB device 360 causes an effect of disconnecting a current-flowing circuit, so that no or less current may flow through the power supply line 301. Therefore, if the current value becomes smaller than the reference value, the mode control unit 330 may detect the connection release of the external electronic device 360 (the USB device) and then change the mode of the I/O interface 270 to the data communication mode.

Additionally, the mode control unit 330 may check directly a connection state of the external electronic device 360 (e.g., the USB device). For example, the mode control unit 330 may check the connection of the external electronic device 360 (e.g., the USB device) by measuring a current flowing through the connector 340 or a voltage applied to the connector 340. Also, the mode control unit 330 may transmit a specific signal through the connector 340 and then, from a response of the external electronic device 360 (e.g., the USB device), check whether the external electronic device 360 (e.g., the USB device) is connected or not. If a release of connection of the external electronic device 360 (e.g., the USB device) is detected, the mode control unit 330 may change the mode of the I/O interface 270 to the data communication mode.

According to an embodiment of the present disclosure, the mode control unit 330 may detect, in the charging mode, the completion of charging of the external electronic device 360 (e.g., the USB device) connected to the connector 340. Specifically, in case the power supply unit 310 supplies a charging current through the power supply line 301 in the charging mode, the current flowing through the power supply line 301 (supplied through the power supply line 301) may decrease due to a reduced difference in voltage, etc. when charging of the external electronic device 360 is completed. In this case, the mode control unit 330 may measure the current flowing through the power supply line 301 and compare it with the predetermined reference value. The mode control unit 330 may change the operating mode of the I/O interface 270 by determining whether the current value is greater or smaller than the reference value. Namely, if the current value is smaller than the reference value, the mode control unit 330 may change the operating mode to the data communication mode.

The mode control unit 330 may check directly in real time the degree of charging of the external electronic device 360 (e.g., the USB device). Therefore, the mode control unit 330 may change the charging mode of the I/O interface 270 to the data communication mode when a battery of the external electronic device 360 is charged completely, and also change the data communication mode of the I/O interface 270 to the charging mode when the battery of the external electronic device 360 is discharged.

Therefore, if charging of the external electronic device 360 is completed, the electronic device 300 according to an embodiment of the present disclosure may stop an unnecessary charging operation by changing the operating mode.

When a user's command to change the mode is inputted, the mode control unit 330 may check whether the external electronic device 360 connected to the connector 360 supports the charging mode, and then, if the external electronic device 360 fails to support the charging mode, may change the mode of the I/O interface 270 to the data communication mode. For example, if a USB mouse or USB keyboard incapable of supporting the charging mode is connected to the electronic device, the mode control unit 330 may maintain the data communication mode of the I/O interface 270 even though the mode change command to change the I/O interface 270 to the charging mode is inputted.

The mode change command may be inputted from a user through the switch (not shown) equipped in the mode control unit 330 or through the input module 250 shown in FIG. 2. Namely, a user may change the operating mode of the I/O interface 270 by inputting the mode change command manually.

When there is an input of the mode change command in case the operating mode of the I/O interface 270 is the data communication mode, the mode control unit 330 may determine whether the external electronic device 360 connected to the connector 340 supports the charging mode. If the mode of the I/O interface 270 is changed to the charging mode in response to a user input even when the external electronic device 360 fails to support the charging mode, the connected external electronic device may not be detected or operate properly. Therefore, when the external electronic device 360 is connected, the mode control unit 330 receives information about the external electronic device 360 and then check whether the external electronic device 360 supports the charging mode. Additionally, after changing the mode of the I/O interface 270 to the charging mode, the mode control unit 330 may measure the current supplied by the power supply unit 310, compare the current value with the reference value, and then change the operating mode of the I/O interface 270 to the data communication mode.

Specifically, in case the external electronic device 360 fails to support the charging mode, the current supplied to the power supply line 301 by the power supply unit 310 in the charging mode may decrease without being maintained. In this case, the sensor module 331 of the mode control unit 330 may measure the current flowing through the power supply line 301. Then the comparator 332 of the mode control unit 330 may compare the measured current value with the predetermined reference value and output a comparison signal. Therefore, if the current value is smaller than the reference value, the mode control unit 330 may change the operating mode to the data communication mode, based on the comparison signal. Namely, even in case the operating mode of the I/O interface 270 is changed to the charging mode in response to a user's manual input, the electronic device 300 according to an embodiment of the present disclosure may change the operating mode of the I/O interface 270 to the data communication mode if the connected external electronic device 360 fails to support the charging mode.

According to the above-discussed various embodiments of this disclosure, the mode control unit 330 may include the sensor module 331, the comparator 332, the charging control IC 333, and the embedded controller 334. These elements are, however, not essential to the mode control unit 330 and, if necessary, some of them may be omitted. Further, such elements may be configured as one module or one chip which can perform collectively functions of the respective elements.

The connector 340 may connect the external electronic device 360. The connector 340 may be equipped on one lateral side of the electronic device 300. The connector 340 may be connected to the external electronic device 360 directly or through a separate cable.

A host controller 350 may control the data transmission to or from the external electronic device 360 (e.g., the USB device) connected to the connector. If the mode of the I/O interface 270 is the charging mode, the host controller 350 may maintain an idle state. If the mode of the I/O interface 270 is changed to the data communication mode, the host controller 350 may transmit and manage information stored in the electronic device 300 and the external electronic device 360.

According to an embodiment of this disclosure, the electronic device 300 including the I/O interface 270 capable of changing the operating mode thereof to the data communication mode or to the charging mode may include the connector 340 to which the external electronic device 360 is connected, the power supply unit 310 for supplying electric power to the external electronic device 360 through the power supply line 301 connected to the connector 340, the host controller 350 for controlling data transmission to or from the external electronic device 360, and the mode control unit 330 for measuring an electric current flowing through the power supply line 301, changing the operating mode based on a result of comparing a measured current value with a reference value, and controlling operations of the power supply unit 310 and of the host controller 350 depending on the operating mode.

The power supply unit 301 may include a limit circuit for preventing an electric current greater than a setting value from flowing to the power supply line 301.

The mode control unit 330 may include the sensor module 331 for measuring an electric current flowing through the power supply line 301, and the comparator 332 for comparing the current value with the reference value and outputting a comparison signal depending on a comparison result.

The mode control unit 330 may analyze the comparison signal, change the operating mode to the data communication mode when the current value is smaller than the reference value, and change the operating mode to the charging mode when the current value is equal to or greater than the reference value.

The mode control unit 330 may control the power supply unit 310 to supply the electric power to the external electronic device 360 in case the operating mode is the charging mode, and control the power supply unit 310 to stop a supply of the electric power in case the operating mode is the data communication mode.

The mode control unit 330 may include the charging control IC 333 for controlling the operation of the power supply unit 310, and the embedded controller 334 for changing the operating mode in response to a user's input.

The mode control unit 330 may change the operating mode to the data communication mode when the connection of the external electronic device 360 connected to the connector 340 is released.

The mode control unit 330 may change the operating mode to the data communication mode when charging of the external electronic device 360 connected to the connector 340 is completed in the charging mode.

The mode control unit 330 may include the switch for receiving a mode change command from a user. When the mode change command for changing the operating mode of the I/O interface 270 to the charging mode is received from the user, the mode control unit 330 may check whether the external electronic device 360 connected to the connector 340 supports the charging mode and then, if the external electronic device 360 fails to support the charging mode, may change the operating mode to the data communication mode.

The electronic device 300 according to an embodiment of this disclosure may further include the sensing resistor 305 inserted in the power supply line 301 and being as a current measurement target of the mode control unit 330.

When the operating mode of the I/O interface 270 is the charging mode, the mode control unit 330 may stop the operation of the host controller 350 and control the power supply unit 310 to supply the electric power.

Figure 4:
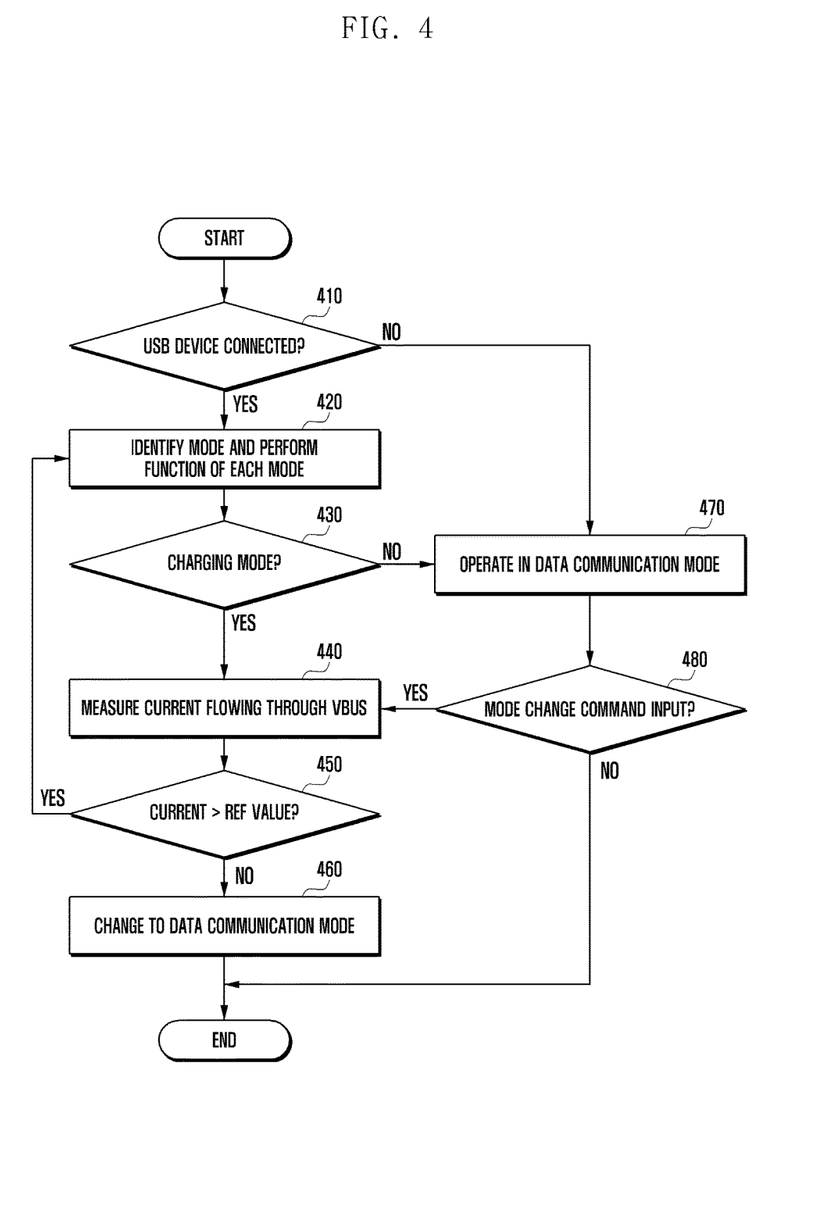
FIG. 4 is a flow diagram illustrating an I/O interface control method of an electronic device according to various embodiments of the present disclosure.

FIG. 4 is a flow diagram illustrating an I/O interface control method of an electronic device according to various embodiments of the present invention.

At operation 410, the electronic device 300 may identify a connection state of the external electronic device 360 (e.g., the USB device) connected to the connector 340. Specifically, at the operation 410, the power supply unit 310 may supply electric power to the external electronic device 360 through the power supply line 301. In this case, the electric power may be a charging current. At the operation 410, the mode control unit 330 may measure an electric current flowing through the power supply line 301. In this case, the mode control unit 330 may compare the measured current with a reference value. At the operation 410, the mode control unit 330 may determine whether the measured current value is smaller than the reference value. At the operation 410, if the current value is smaller than the reference value, the mode control unit 330 may change the operating mode of the I/O interface 270 to the data communication mode by determining that the connection of the external electronic device 360 is released. Since no data communication is performed in the charging mode even when a new external electronic device 360 is connected, this may cause a failure in recognition of the connected external electronic device 360. Therefore, the I/O interface control method according to an embodiment of this disclosure changes automatically the operating mode of the I/O interface 270 to the data communication when the connection of the external electronic device 360 connected to the electronic device 300 is released, thereby preventing failures in recognition and operation when a new external electronic device 360 is connected thereafter.

At the operation 410, if the connection of the external electronic device 360 is detected, a program (or application) stored in the memory 230 of the electronic device 300 may be triggered by the application processor 210. At the operation 410, the electronic device 300 may detect the connection of the external electronic device 360 by the execution of an OS and an application, and then display, on the display module 260, a notification window or pop-up window indicating that the external electronic device 360 is connected.

At operation 420, the electronic device 300 may identify the operating mode of the I/O interface 270 and then perform a function in each mode. Specifically, if the operating mode of the I/O interface 270 is the charging mode, the electronic device 300 may supply electric power to the external electronic device 360 by the power supply unit 310 at the operation 420. Additionally, if the operating mode of the I/O interface 270 is the data communication mode, the electronic device 300 may perform a data transmission and managing function between the electronic device 300 and the external electronic device 360 by the host controller 350 at the operation 420. At the operation 420, in case of the charging mode, the electronic device 300 may perform only the charging operation of the external electronic device 360 without any data transmission operation.

At operation 430, the operating mode of the I/O interface 270 may be branched into the charging mode and the data communication mode.

At operation 440, the electronic device 300 may enable the I/O interface 270 to perform the function of the charging mode. At the operation 440, the mode control unit 330 may measure the current flowing through the power supply line 301. At the operation 440, the sensor module 331 of the mode control unit 330 may measure the current flowing through the power supply line 301. The current flowing through the power supply line 301 may be an electric current supplied for charging the external electronic device 360 by the power supply unit 310.

At operation 450, the mode control unit 330 may compare the measured current with a reference value. Specifically, if the I/O interface 270 still maintains the charging mode in case the connection of the external electronic device 360 connected to the electronic device 300 is released, in case charging of the external electronic device 360 connected to the electronic device 300 is completed in the charging mode, or in case the external electronic device 360 connected to the electronic device 300 fails to support the charging mode, a failure in recognition or a failure in operation may occur when a new external electronic device 360 is connected thereafter. Further, in the above cases, the current flowing through the power supply line 301 decreases. Meanwhile, the comparator 332 of the mode control unit 330 may output a comparison signal indicating the result of comparison between the current value and the reference value. Therefore, at the operation 450, the mode control unit 330 may change the operating mode of the I/O interface 270 to the data communication mode by determining, based on the comparison signal, case where the current value is smaller than the reference value. On the contrary, if the current flowing through the power supply line 301 is equal to or greater than the reference value (when the comparator 332 outputs the comparison signal indicating that the measured current is equal to or greater than the reference value), the electronic device 300 may perform the operation 420.

At operation 460, the mode control unit 330 may control the operation of the power supply unit 310 while changing the operating mode of the I/O interface 270. For example, in case the I/O interface 270 is changed from the charging mode to the data communication mode, the mode control unit 330 may control the power supply unit 310 to stop the operation of supplying the power to the external electronic device 360. Alternatively, the mode control unit 330 may decrease the amount of power being supplied to the external electronic device 350 by the power supply unit 310.

At operation 470, the mode control unit 330 of the electronic device 300 may change the operating mode to the data communication mode. Namely, the electronic device 300 according to an embodiment of the present disclosure may allow the operating mode of the I/O interface 270 to be always changed to the data communication mode when the connection of the external electronic device 360 (e.g., the USB device) is released.

At operation 480, the electronic device 300 may receive a mode change command from a user. The mode change command may be entered through the input module 250 or the switch equipped in the mode control unit 330. At the operation 480, if there is no mode change command from a user, the electronic device 300 may maintain the operating mode of the I/O interface 270 as the data communication mode. The mode change command may be an input for changing the mode of the I/O interface 270 to the charging mode. If there is the mode change command (a user's input for changing to the charging mode) at the operation 480, the operation 440 may be performed.

Also, in the I/O interface control method according to an embodiment of the present disclosure, the mode change command may be entered at any time only if the electronic device 300 is operated.

In this case, the electronic device 300 may determine whether the connected external electronic device 360 supports the charging mode. If the external electronic device 360 fails to support the charging mode, the electronic device 300 may change again the operating mode of the I/O interface 270 to the data communication mode. Therefore, the I/O interface control method according to an embodiment of the present disclosure may prevent a failure in recognition and a failure in operation of the external electronic device 360 due to any non-supportable mode established when the external electronic device 360 incapable of supporting the charging mode is connected to the electronic device 300.

The I/O interface control method according to an embodiment of this disclosure may include operations of identifying a connection state of an external electronic device connected to a connector, and when a connection of the external electronic device is released, changing the operating mode of the I/O interface to the data communication mode.

The operation of identifying the connection state of the external electronic device may include operations of measuring an electric current being supplied to the external electronic device through a power supply line, and if a measured current value is smaller than a reference value, identifying that the connection of the external electronic device is released.

The I/O interface control method according to an embodiment of this disclosure may further include operations of identifying the operating mode of the I/O interface, when the operating mode of the I/O interface is the charging mode, measuring an electric current of a power supply line for supplying electric power to the external electronic device, comparing a measured current value with a reference value, and if the current value is smaller than the reference value, changing the operating mode of the I/O interface to the data communication mode.

The I/O interface control method according to an embodiment of this disclosure may further include operations of receiving, from a user, a mode change command to change the operating mode of the I/O interface to the charging mode, determining whether the external electronic device connected to the connector supports the charging mode, and if the external electronic device fails to support the charging mode, changing the operating mode of the I/O interface to the data communication mode.

The charging mode may be a dedicated charging port (DCP) mode, and the data communication mode may be one of a standard downstreaming port (SDP) mode and a charging downstreaming port (CDP) mode.

The I/O interface control method according to an embodiment of this disclosure may further include operations of, if the mode of the I/O interface is the charging mode, changing the mode of the I/O interface to the data communication mode when charging of the external electronic device connected to the connector is completed.

The I/O interface control method according to an embodiment of this disclosure may further include operations of, if the mode of the I/O interface is the data communication mode, changing the mode of the I/O interface to the charging mode when the external electronic device connected to the connector is discharged.

Figure 5A:
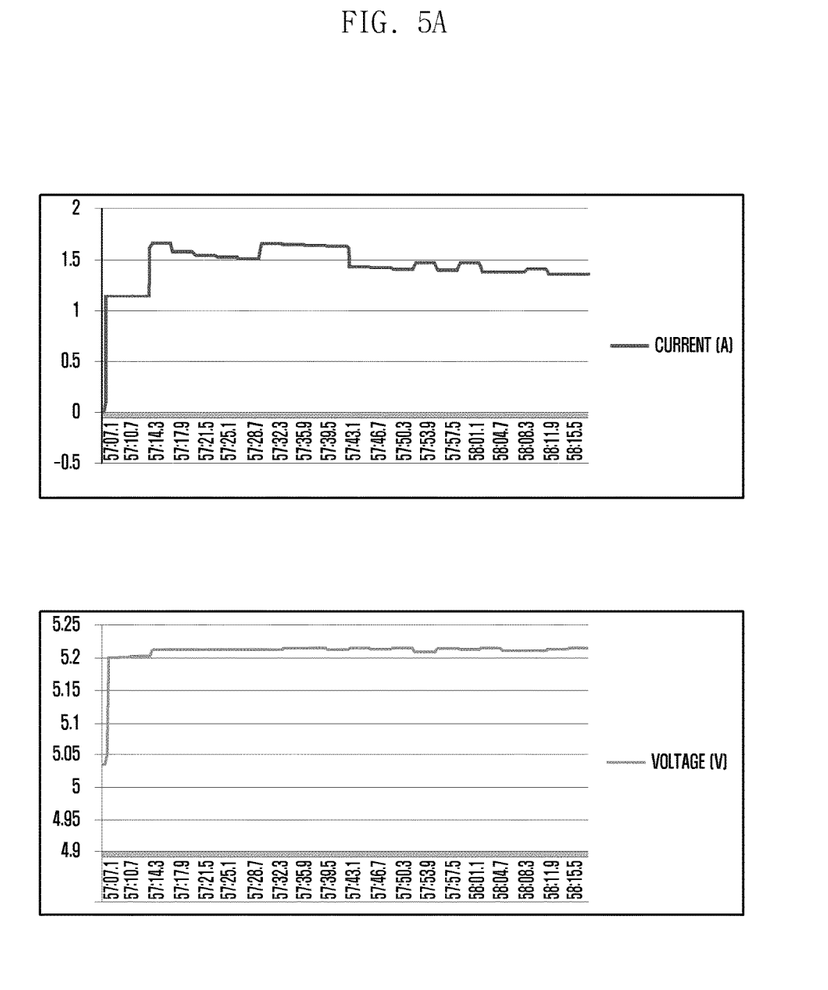
FIGS. 5A and 5B are diagrams illustrating currents and voltages in case of charging an external electronic device by using an adapter and in case of charging an external electronic device by using an electronic device according to various embodiments of the present disclosure.
Figure 5B:
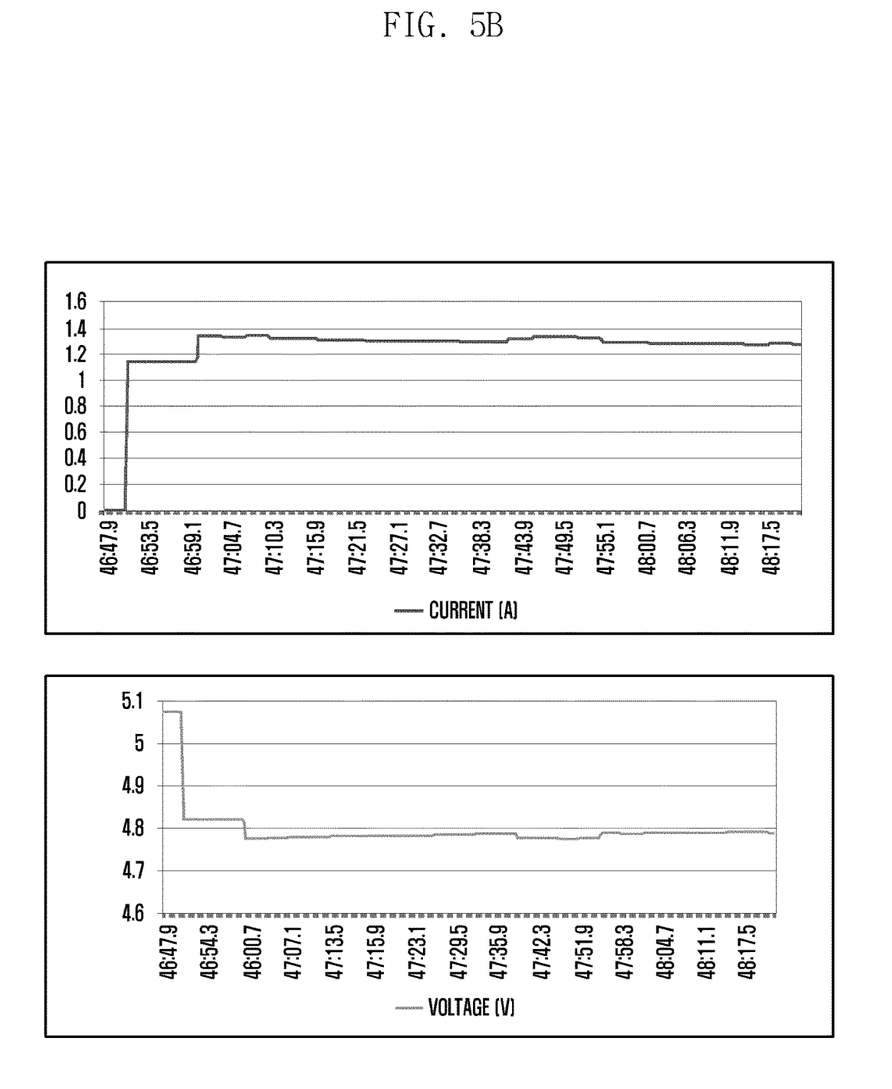

FIGS. 5A and 5B are diagrams illustrating currents and voltages in case of charging the external electronic device 360 by using an adapter and in case of charging the external electronic device 360 (e.g., the USB device) by using the electronic device 300 according to various embodiments of this disclosure.

FIG. 5A is a graph illustrating a current and voltage in case of charging the external electronic device 360 by using an adapter. When the external electronic device 360 is changed using the adapter, a greater current and voltage is supplied than case where the electronic device 300 charges the external electronic device 360 in the charging mode. Therefore, using the adapter may allow the external electronic device 360 to be charged at a higher rate. However, in case of using the adapter, there is a demerit that only charging of the external electronic device 360 is allowed separately from data communication.

FIG. 5B shows a current and voltage in case of charging the external electronic device 360 by using the electronic device 300 according to various embodiments of the present disclosure.

Referring FIG. 5B, in case the operating mode of the I/O interface 270 is the charging mode, the external electronic device 360 is charged with the current ranging between 1.2 A and 1.4 A. In this case, a voltage of about 4.8V is applied to the external electronic device 360. In this case, when charging of the external electronic device 360 is completed, or when the connection of the external electronic device is released, the charging current may decrease. Therefore, by establishing a specific current value (e.g., 400 mA) as a reference value, when the current decreases below the reference value, it may be identified that charging of the external electronic device 360 is completed or that the external electronic device 360 is disconnected from the electronic device 300. Accordingly, in the I/O interface control method and the electronic device 300 according to an embodiment of this disclosure, if the current flowing through the power supply line 301 decreases below the reference value in the charging mode, the electronic device 300 may stop charging of the external electronic device 360 by changing the operating mode of the I/O interface 270 to the data communication mode, thus reducing power consumption.

When the external electronic device 360 is connected to the electronic device 300 in the charging mode, the electronic device 300 fails to recognize the external electronic device 360 since data transmission is disallowed. Therefore, when any external electronic device 360 is connected to the electronic device 300, the USB interface control method and the electronic device according to various embodiments of this disclosure may prevent a failure in recognition and a failure in operation of the connected new external electronic device 360 by allowing the external electronic device 360 to be connected in the data communication mode.

A computer-readable storage medium according to an embodiment of this disclosure may record thereon one or more programs that include commands to perform the I/O interface control method.

Herein, the I/O interface control method may include an operation of identifying that the connection of the external electronic device 360 is released from the connector 340, and an operation of changing the mode of the I/O interface 270 to the data communication mode when the connection of the external electronic device 360 is released.

The above-discussed method is described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The embodiments disclosed in the present specifications and drawings were provided merely to readily describe and to help a thorough understanding of the present invention but not intended to limit the scope of the present invention. Therefore, it should be construed that all modifications or modified forms drawn by the technical idea of the present invention in addition to the embodiments disclosed herein are included in the scope of the present invention.

What is claimed is:

1. An electronic device including an input/output (I/O) interface capable of changing an operating mode thereof to a data communication mode or to a charging mode, the I/O interface comprising:
   a connector to which an external electronic device is connected;
   a power supply unit for supplying electric power to the external electronic device through a power supply line connected to the connector;
   a host controller for controlling data transmission to or from the external electronic device; and
   a mode control unit for measuring an electric current flowing through the power supply line, changing the operating mode based on a result of comparing a measured current value with a reference value, and controlling operations of the power supply unit and of the host controller depending on the operating mode,
   wherein the mode control unit is further configured to change the operating mode to the data communication mode in response that a connection of the external electronic device connected to the connector is released.

2. The electronic device of claim 1, wherein the power supply unit includes a limit circuit for preventing an electric current greater than a setting value from flowing to the power supply line.

3. The electronic device of claim 1, wherein the mode control unit includes:
   a sensor module for measuring an electric current flowing through the power supply line; and
   a comparator for comparing the current value with the reference value and outputting a comparison signal depending on a comparison result.

4. The electronic device of claim 3, wherein the mode control unit analyzes the comparison signal, changes the operating mode to the data communication mode when the current value is smaller than the reference value, and changes the operating mode to the charging mode when the current value is equal to or greater than the reference value.

5. The electronic device of claim 1, wherein the mode control unit controls the power supply unit to supply the electric power to the external electronic device in case the operating mode is the charging mode, and controls the power supply unit to stop a supply of the electric power in case the operating mode is the data communication mode.

6. The electronic device of claim 1, wherein the mode control unit includes:
   a charging control IC for controlling an operation of the power supply unit; and
   an embedded controller for changing the operating mode in response to a user's input.

7. The electronic device of claim 1, wherein the mode control unit changes the operating mode to the data communication mode when charging of the external electronic device connected to the connector is completed in the charging mode.

8. The electronic device of claim 1, wherein the mode control unit includes a switch for receiving a mode change command from a user.

9. The electronic device of claim 8, wherein when the mode change command for changing the operating mode of the I/O interface to the charging mode is received from the user, the mode control unit checks whether the external electronic device connected to the connector supports the charging mode and then, if the external electronic device fails to support the charging mode, changes the operating mode to the data communication mode.

10. The electronic device of claim 1, further comprising:
a sensing resistor inserted in the power supply line and being as a current measurement target of the mode control unit.

11. The electronic device of claim 1, wherein when the operating mode of the I/O interface is the charging mode, the mode control unit stops an operation of the host controller and controls the power supply unit to supply the electric power.

12. A method for controlling an input/output (I/O) interface capable of changing an operating mode thereof to a data communication mode or to a charging mode in an electronic device including the I/O interface, the method comprising operations of:
identifying a connection of an external electronic device;
changing the operating mode based on an electric current supplied to the external electronic device;
controlling operation of charging the external electronic device or operation of data communication with the external electronic device according to a current operating mode; and
changing the operating mode of the I/O interface to the data communication mode in response that a connection of the external electronic device connected to a connector is released.

13. The I/O interface control method of claim 12, wherein the operation of identifying the connection of the external electronic device includes operations of:
measuring an electric current being supplied to the external electronic device through a power supply line; and
if a measured current value is smaller than a reference value, identifying that the connection of the external electronic device is released.

14. The I/O interface control method of claim 12, further comprising operations of:
identifying the operating mode of the I/O interface;
when the operating mode of the I/O interface is the charging mode, measuring an electric current of a power supply line for supplying electric power to the external electronic device;
comparing a measured current value with a reference value; and
if the current value is smaller than the reference value, changing the operating mode of the I/O interface to the data communication mode.

15. The I/O interface control method of claim 12, further comprising operations of:
receiving, from a user, a mode change command to change the operating mode of the I/O interface to the charging mode;
determining whether the external electronic device connected to the connector supports the charging mode; and
if the external electronic device fails to support the charging mode, changing the operating mode of the I/O interface to the data communication mode.

16. The I/O interface control method of claim 12, wherein the charging mode is a dedicated charging port (DCP) mode, and the data communication mode is one of a standard downstreaming port (SDP) mode and a charging downstreaming port (CDP) mode.

17. The I/O interface control method of claim 13, further comprising operation of:
if the mode of the I/O interface is the charging mode, changing the mode of the I/O interface to the data communication mode when charging of the external electronic device connected to the connector is completed.

18. The I/O interface control method of claim 13, further comprising operation of:
if the mode of the I/O interface is the data communication mode, changing the mode of the I/O interface to the charging mode when the external electronic device connected to the connector is discharged.

19. A computer-readable storage medium recording thereon one or more programs including commands for enabling an electronic device, including an input/output (I/O) interface capable of changing an operating mode thereof to a data communication mode or to a charging mode, to perform a method for controlling the I/O interface, the method comprising operations of:
identifying a connection of an external electronic device;
changing the operating mode based on an electric current supplied to the external electronic device;
controlling operation of charging the external electronic device or operation of data communication with the external electronic device according to the operation mode; and
changing the operating mode of the I/O interface to the data communication mode in response that a connection of the external electronic device connected to a connector is released.

* * * * *